United States Patent [19]
Haneda

[11] Patent Number: 5,434,838
[45] Date of Patent: Jul. 18, 1995

[54] DATA RECORDING APPARATUS AND METHOD WITH VERIFICATION OF OPTICAL DISC

[75] Inventor: Norihisa Haneda, Tokyo, Japan

[73] Assignee: Fuji Photo Film Co., Ltd., Kanagawa, Japan

[21] Appl. No.: 985,948

[22] Filed: Dec. 4, 1992

[30] Foreign Application Priority Data

Dec. 5, 1991 [JP] Japan ................... 3-348432
Dec. 27, 1991 [JP] Japan ................... 3-346392

[51] Int. Cl.⁶ ............................................. G11B 7/00
[52] U.S. Cl. ........................... 369/58; 369/44.25; 369/32
[58] Field of Search ............ 369/44.11, 44.32, 50, 369/44.26, 44.27, 44.28, 44.29, 32, 48, 58, 54, 83, 84; 360/13, 15, 35.1, 14.1; 358/342, 335, 403, 450, 451

[56] References Cited

U.S. PATENT DOCUMENTS

| | | | |
|---|---|---|---|
| 4,261,012 | 4/1981 | Maloomian | 360/14.1 |
| 4,325,134 | 4/1982 | Langley et al. | 369/58 |
| 4,688,105 | 8/1987 | Bloch et al. | 358/335 |
| 4,706,135 | 11/1987 | Kojima | 360/14.1 |
| 4,730,290 | 3/1988 | Takasago et al. | 369/58 |
| 4,823,333 | 4/1989 | Satoh et al. | 369/48 |
| 4,839,747 | 6/1989 | Fujiwara | 358/342 |
| 4,969,139 | 11/1990 | Azumatani et al. | 358/342 |
| 4,969,204 | 11/1990 | Melnychuck et al. | 358/426 |
| 4,972,274 | 11/1990 | Becker et al. | 360/15 |
| 4,972,398 | 11/1990 | Wachi | 369/58 |
| 4,985,784 | 1/1991 | Tsuboi et al. | 358/342 |
| 5,018,124 | 5/1991 | Ogasawara et al. | 369/44.32 |
| 5,068,745 | 11/1991 | Shimura | 358/403 |
| 5,153,730 | 10/1992 | Nagasaki et al. | 360/35.1 |
| 5,210,735 | 5/1993 | Hoshino et al. | 369/44.32 |
| 5,212,677 | 5/1993 | Shimote et al. | 369/59 |
| 5,233,438 | 8/1993 | Funahashi et al. | 358/342 |
| 5,253,239 | 10/1993 | Edahiro et al. | 369/44.32 |
| 5,256,965 | 10/1993 | Nomura | 369/58 |

FOREIGN PATENT DOCUMENTS 59-191145 10/1984 Japan.

*Primary Examiner*—Georgia Y. Epps
*Assistant Examiner*—Nabil Hindi

[57] ABSTRACT

An apparatus for recording data on a post-writing basis onto an a write-once, read-many optical disc of the compact disc standard has a reader unit for reading first image data recorded on a first optical disc, an input unit for receiving second image data, and a recorder unit for recording image data onto a second optical disc. A control unit is provided for controlling the reader unit, the input unit and the recorder unit to cause the reader unit to read out the first image data from the first optical disc and to cause the recorder unit to record the first and second image data onto the second optical disc. The reader unit has verification circuitry for verifying the condition of the recording surface of the first optical disc to determine whether or not the surface is appropriate for recording of the second image data.

16 Claims, 13 Drawing Sheets

36

ONE TURN OF DISK

DATA RECORDING APPARATUS AND METHOD WITH VERIFICATION OF OPTICAL DISC

BACKGROUND OF THE INVENTION

1. Field of the Invention

The present invention relates to apparatus for and a method of recording data on an optical disc, wherein image data are recorded on an optical disc 10 formatted under the Compact Disc (CD) standard, and more particularly to such an apparatus and a method including verifying an optical disc to determine presence/absence of a defect such as a crack on the optical disc.

2. Description of the Background Art

Compact Disc ROMs (CD-Rs) implemented on optical discs provided under the Compact Disc Standard (Orange Book Standard) regulated by Sony and Philips' are directed to, hitherto, only the type for one-time recording in which a session of data is recorded at a time, even though there are found a few differences in processing, such as pressing from a pre-master and a pre-recording by a one-time recording. The progress of 25 the technology permits the use of a type of disc available for post-writing such as an additional writing or recording and a rewriting. These types of conventional discs, so-called one-time writing or write-once ROM types, are subjected to recording by software suppliers 30 and then forwarded under a strict quality control. Consequently, it may be that the discs have defects such as cracks formed during the first use.

The post-writing type of photo CDs, regulated by Kodak and Philips', however may be subjected to re-writing of image data by users or laboratories in the event that there remains a vacant or unused area recordable on the discs once recorded, or recorded data may be desired to be erased to rewrite or substitute therefor new data. Image data may be recorded on photo CDs in the form of hierarchical storage of high resolution digital images in a multiuse environment. Such a hierarchical storage system is taught in U.S. Pat. No. 4,969,204 to Melnychuck et al.

While recording of the image data is performed, in general, by a CD writer in a professional laboratory on discs used once, it may happen that the post-writing of new data is not normally performed in the event that such discs are subjected to a defect, such as a crack and extreme dirt thereon, occurring in the process of the user's playing back operation, saving or storage, transportation and the like. Further, there is a possibility that the data recorded on such discs having a defect will not be able to be played back in the future. Since the conventional CD writer is constructed taking account of only the one-time recording type of compact disc, it is difficult under the above-mentioned bad conditions to additionally write new data onto such a disc without the possibility of destroying data already recorded on the disc.

If recording is tried by a conventional CD writer on a compact disc having the bad conditions mentioned above, a tracking error may occur which will be a cause of not only errors in recording of new data but also destroying even the former data already recorded. If the former data is not destroyed, the disc will include data of high data error rate, since the recording is performed on the disc having defects. Further, there is a fear that the data recorded in such discs having defects will not at all be able to be played back in future, and thus it is necessary to cope with this problem.

SUMMARY OF THE INVENTION

It is therefore an object of the present invention to provide an apparatus for and a method of appropriately recording additional data on an optical disc on which data has already been recorded.

It is another object of the present invention to provide an apparatus for and a method of verifying an optical disc to detect a defect such as a crack and dirt on the optical disc so that damage or destruction of the former data recorded and inadequate writing of new data can be avoided.

It is still another object of the present invention to provide an apparatus for and a method of recording data on an optical disc including verifying the disc condition to determine presence/absence of a defect such as a crack on the optical disc.

In accordance with a preferred embodiment of the present invention, there is disclosed an apparatus for recording data on a post-writing basis onto an additionally writable optical disc of the compact disc standard, comprising: a reader unit for reading first image data recorded on a first optical disc; an input unit for inputting second image data; a recorder unit for recording image data onto a second optical disc; and a control unit for controlling the reader unit, the input unit and the recorder unit to cause the reader unit to read out the first image data from the first optical disc, and to cause the recorder unit to record the first and second image data onto the second optical disc.

Further, in accordance with another embodiment of the present invention, there is disclosed a method of recording data on a post-writing basis onto an additionally writable optical disc of the compact disc standard, comprising the steps of: reading first image data recorded on a first optical disc; preparing second image data; and recording onto the 20 second optical disc the first and second image data in the form of respective, independent sessions.

Furthermore, in accordance with a further embodiment of the invention, there is disclosed a 25 method of recording data on a post-writing basis onto an additionally writable optical disc of the compact disc standard, comprising the steps of: reading first image data recorded on a first optical disc; preparing second image data; and recording onto the second 30 optical disc the first and second image data upon unifying the first and second image data in the form of a single session.

In accordance with still another embodiment of the invention, there is disclosed an apparatus for verifying a recording surface of an additionally writable optical disc of the compact disc standard, comprising: a driving unit for carrying and rotating the optical disc at a predetermined speed; a photosensitive pickup for producing a first signal associated with an amount of reflected light from the recording surface of the optical disc; a tracking mechanism for causing the photosensitive pickup to travel along a track of the optical disc; and an arithmetic unit for detecting a disturbance of the first signal to compare the disturbance with a first predetermined value so as to determine a quality of the optical disc, wherein the arithmetic unit determines the optical disc to be defective if the detected disturbance exceeds the first predetermined value.

In accordance with a still further embodiment of the invention, there is disclosed a method of verifying a recording surface of an additionally writable optical disc of the compact disc standard, comprising the steps of: rotating the optical disc at a predetermined speed; causing a photosensitive pickup to travel along a track of the optical disc and obtain a first signal associated with an amount of reflected light from the recording surface of the optical disc; detecting a disturbance of the first signal; and comparing the detected disturbance with a first predetermined value so as to determine the optical disc to be defective if the detected disturbance exceeds the first predetermined value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from consideration of the following detailed description taken in conjunction with the accompanying drawings which are given by way of illustration only and thus are not limitative of the present invention, and in which.

DESCRIPTION OF THE PREFERRED EMBODIMENTS

Figure 1:
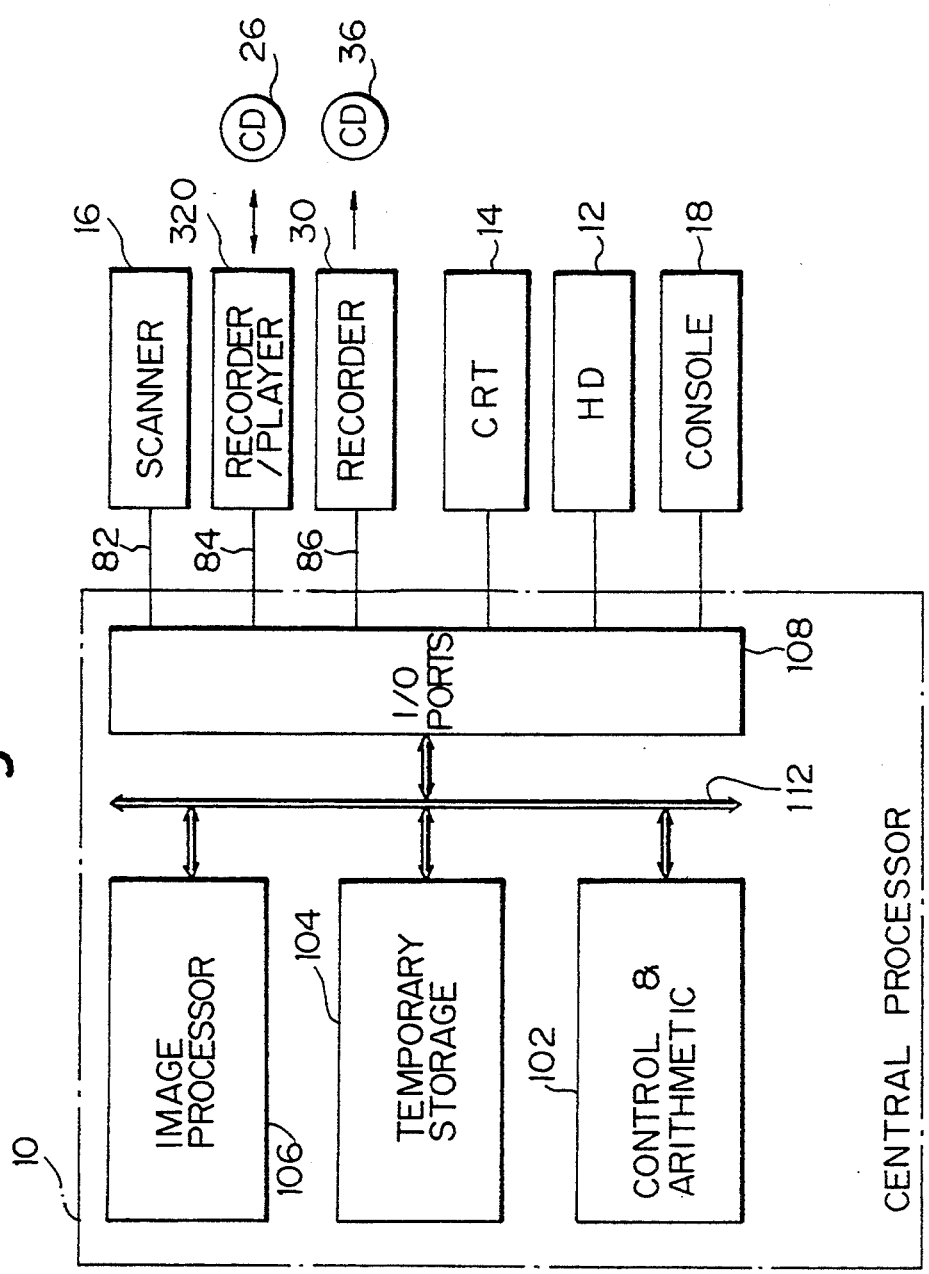
FIG. 1 is a schematic block diagram showing a functional system structure of a data recording apparatus for use with optical discs according to a preferred embodiment of the present invention.

Referring to FIG. 1, an apparatus for recording data on an optical disc according to a preferred embodiment is adapted, basically, to additionally record, on a compact disc (CD) 26 on which image data have been already recorded, in a fashion of post-writing new image signals which may be obtained from an image data source, such as a scanner 16 and/or a hard disc 12. However,the data recording apparatus according to the illustrative embodiment is also provided with such a function that the state of the recording surface of the compact disc 26 is inspected or verified, so that, if there is found no defect preventing the additional writing or recording, new image data will additionally be recorded, whereas, if there is found any defect, the image data are read out from the compact disc 26 and then recorded onto another, virgin compact disc 36 together with the new image data. The data recording apparatus according to the embodiment may record both old and new data either upon arrangement of a single session or in the form of respective individual sessions. Such a data recording apparatus may be installed at a laboratory of a photo CD software supplier, for example.

In order to implement the above-mentioned function, the data recording apparatus is provided with a central processing unit 10 which operates as a main part of the system for controlling operations of the data recording apparatus in its entirety. Connected on an interface basis to the central processing unit are external devices such as a scanner 16, a recorder/player 320 and a recorder through connection lines 82, 84 and 86 of a Small Computer System Interface (SCSI) Standard, respectively. Further, connected to the central processor unit 10 are peripheral equipment such as a display 14 (e.g. CRT), a hard disc (HD) 12 and an operator console 18, which serve to assist the operational functions of the central processor 10. The hard disc 12 is implemented as a storage unit in which program sequences to operate the system, image data and the like are stored. Those peripheral equipment or devices and the central processor 10 are implemented advantageously with a personal computer system available in the market.

The recorder/player 320 serves, when the compact disc 26 is detachably mounted thereon, to read out image data recorded on the disc 26 and then send it to the central processor 10. It further serves to record on the compact disc 26 other image data transmitted from the central processor 10. The recorder/player 320 is also provided with a function such that prior to recording new image data on the disc 26, the disc 26 is verified to determine the presence and/or absence of a defect or hindrance against recording and/or playback, such as dirt and a crack on the recording surface of the disc 26. This inspection or verification is implemented by determining the quality of tracking efficiency by means of a pre-groove cut on the disc 26, detecting degradation of the quantity or intensity of light reflected from the surface, detecting a projection in tracking signals obtained, etc. Details on how to verify the disc 26 will be described later.

The recording apparatus 30 serves, when the additional compact disc 36 is detachably mounted thereon, to record on the compact disc 36 image data transmitted from the central processor 10. The reason why the recording apparatus 30 is provided in addition to the recorder/player 320 is that when a defect mentioned above is detected on the compact disc 26, on which new image data is intended to additionally be recorded, the image data will be recorded on the additional disc 36 by the recording apparatus 30.

To the compact discs 26 and 36, the post- or 5 additional-recording type of compact disc according to the so-called the Sony and Philips' Compact Disc Standard may be advantageously applied. However, the compact discs 26 and 36 are not restricted in use to such a disc. In the present embodiment, any types of optical disc such as an additional writing and/or a rewriting type are available, and further a one-time recording type of disc and a so-called rewriting type of disc re-usable upon erasing are also available. It is assumed that one of two discs, that is, the disc 26, is one brought by customers, and the other disc 36 is one not yet subjected to data recording and often referred to as a virgin disc. The recorded compact disc 26 is brought by a customer to the laboratory together with a color negative film, not shown, carrying images to be additionally recorded.

The scanner 16 is an image reading apparatus adapted to read with high resolution color images recorded on the color negative film mentioned above, for example, and transfer the corresponding image signals to the central processor 10. In the instant system, the image data read from the negative film are recorded on the compact disc 26 or 36.

The central processor 10 includes a control and arithmetic unit 102 for performing arithmetic operations and control, a temporary storage such as RAM 104 in which various data are temporarily stored for operating the data recording apparatus, an image processor 106 for performing compression, expansion, edition, etc, of the image data, and input/output (I/O) ports 108 for developing and receiving signals with the external apparatus and the peripheral equipments. Those units are connected with each other by connections 112 as shown in FIG. 1. The connections 112 are implemented as a bus system on which data and control signals are conveyed between the respective constituent elements of the central processor 10.

The control and arithmetic unit 102 serves to control the operations of the data recording apparatus in its entirety. According to the control and arithmetic unit 102, there is provided basically the following control, for example. The image data read by the scanner 16 is recorded on the compact disc 26 by the recorder/player 320. Prior to the recording, the recorder/player 320 inspects or verifies the state of the recording surface of the compact disc 26. In accordance with the result therefrom, if it is determined that a defect such as a crack exists on the recording surface of the compact disc 26, then the recorder/player 320 reads out the image data from the compact disc 26, and the recording apparatus 30 in turn records the image data thus read out on the other compact disc 36 together with the image data supplied from the scanner 16 in the form of a single session or respective separate sessions of data. Further, the control and arithmetic unit 102 is adapted to perform expansion and compression of the image data, encoding and decoding the image signals, and converting the signals of the compact disc standard into the recording format. The temporary storage 104 is provided also with storage areas for a work area for the control and arithmetic unit 102, and a buffer memory area used during data transfer in conjunction with the external apparatus and the peripheral equipment, etc. The image processor 106 serves to perform the image data processings, such as image combining, editing, organizing, repairing, etc. Those image data processings are performed under the control of the control and arithmetic unit 102.

The display 14 is adapted for visually displaying the states of the system and images to be processed. The operator console 18 is implemented as an input device for inputting operator's instructions and data, and is provided with keys by which entered to the system are various instructions, such as an instruction causing negative film images to be read by the scanner 16, instructions and conditions for image processing, an instruction for causing the state of the compact disc 26 to be verified, an instruction causing the image data to be recorded onto the disc 26 or 36 by the recorder/player 320 or the recorder 30, and an instruction requiring the old and new image data to be unified to a single session, as will be described later.

Figure 4:
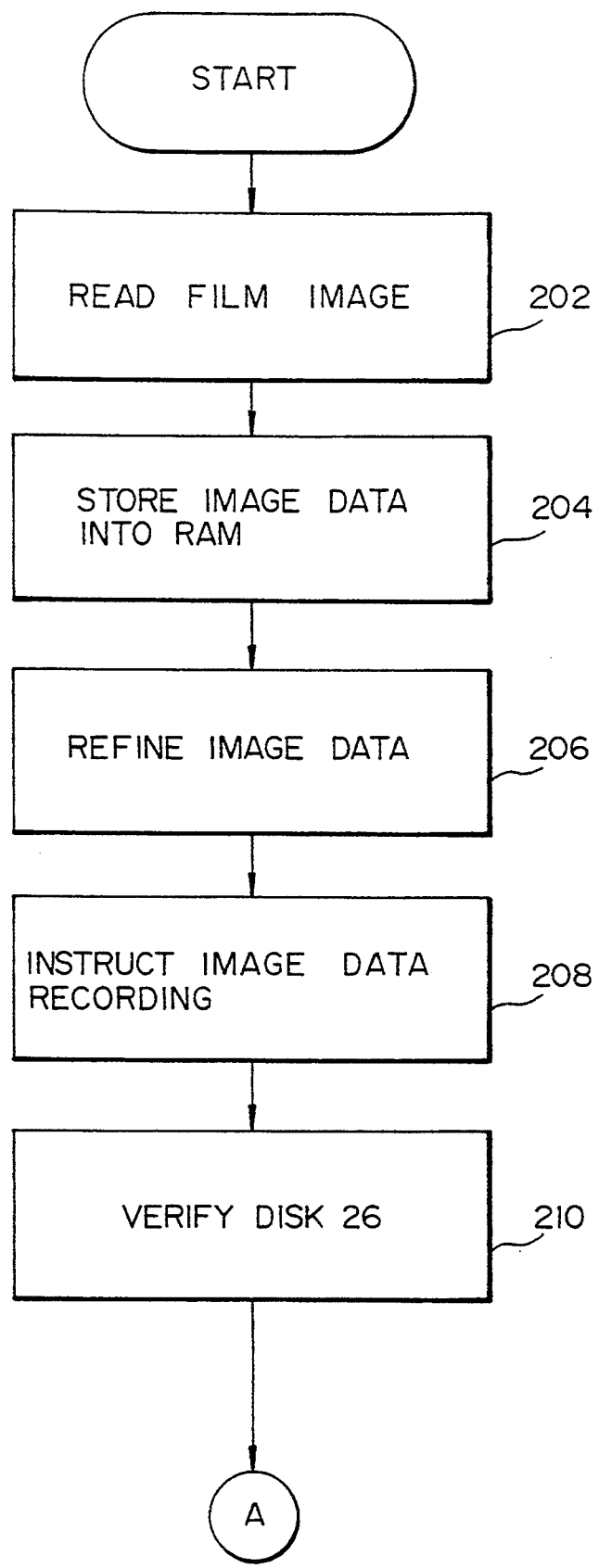
FIGS. 4 and 5 are flow charts useful for understanding the operation of the data recording apparatus shown in FIG. 1.
Figure 5:
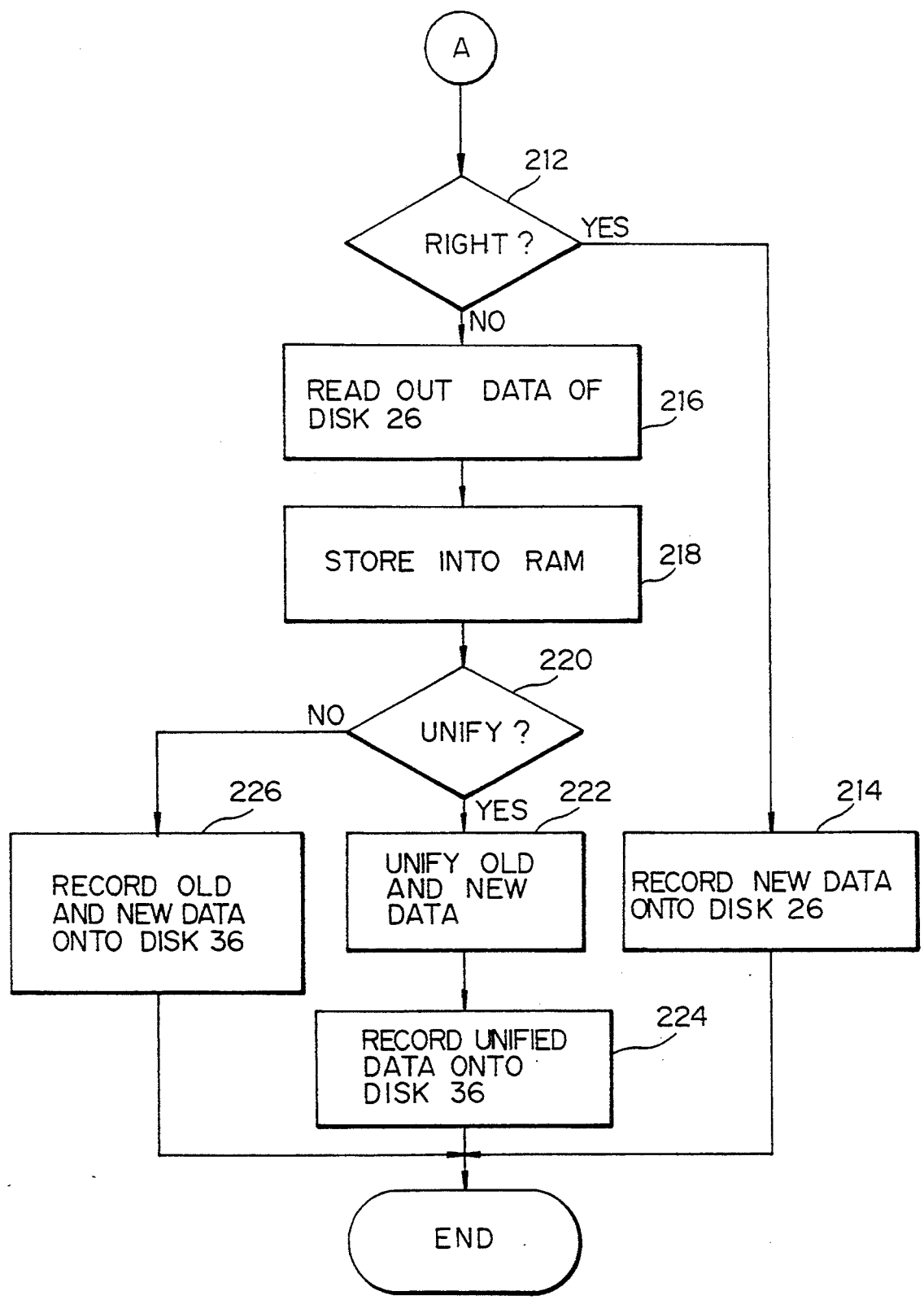

In operation, referring also to FIGS. 4 and 5, a negative film, not shown, brought in the laboratory is set to the scanner 16, while the compact disc 26 also brought together with the negative is set to the recorder/player 320. An operator designates through the console 18 a frame of image recorded on the negative and instructs reading of the image thereof. In response to the instruction, the central processor 10 controls the scanner 16 to read the designated frame of image which the film carries (step 202 in FIG. 4). Image data representing the read image are transmitted on the connection line 82 to the central processor 10.

In the central processor 10, the received image data are stored in the temporary storage 104 through an interface of the I/O ports 108 (step 204). Simultaneously, the central processor 10 causes the display 14 to display the same image data. In view of the displayed image on the display 14, the operator instructs color correction and/or tonal or gradation correction if necessarily on a poor image due to inadequate exposure of the negative film. In response to the instruction, the image processor 106 refines the image (step 206), and the control and arithmetic unit 102 compresses and encodes the resultant image data, and converts them into the compact disc standard of recording format. The image data, which have completed those processings, are recorded on the compact disc 26 by the recorder/player 320, and in addition, if necessary, onto the hard disc 12.

Now, the central processor 10 instructs the recorder/player 320 to record the image data (step 208). In response to the instruction, the recorder/player 320 verifies the recording surface of the disc 26 to determine the presence/absence of a defect or hindrance against recording and/or playback, such as dirt and a crack on the recording surface, particularly a virgin recording area of the disc 26 (step 210). This verification is performed by determining the quality of tracking efficiency as to the disc 26, detecting degradation of the quantity or intensity of light reflected on the recording surface, detecting a projection in tracking signals, etc. In the verification of step 210, if there is found no malfunction on the disc 26 (step 212 in FIG. 5), then the central processor unit 10 sends the image data after refinement. More specifically, the illustrative embodiment sends the image data read by the scanner 16 to the recorder/player 320 so as to record them on a virgin recording area of the disc 26 (step 214).

If there is found however any malfunction on the disc 26 in the verification of step 210, recording of the new image data is not performed onto that disc 26 but the virgin disc 36. In this case, not only simply will the new image data be recorded on the virgin disc 36, but the former image data having been recorded on the disc 26, that is, the old data will also be recorded on the virgin disc 36. The reason for doing so is that there is a fear such that the image data recorded on such a used disc 26 having a defect cannot adequately be read out in future.

More in details, if it is determined that there is any malfunction on the disc 26, the central processor 10 instructs the recorder/player 320 to read the old data stored in the disc 26. In response, the recorder/player 320 reads the old data stored in the disc 26 (step 216) to transfer the read image data on the connection 84 to the central processor 10. The central processor 10 in turn stores the received image data in the temporary storage 104 (step 218), and also transmits the same to the recorder 30 to be recorded onto the virgin disc 36.

According to the embodiment, it is possible to optionally utilize two recording schemes, one is to record the old and new data in the form of respective separate sessions, and the other is to unify and organize both of the old and new image data to record them in the form of a single session. The unification of the old and new image data is particularly effective, for example, in the event that the relationship between both image data is close, and it is more convenient for users in view of a later management and playback use to have the session uniform.

When an instruction is entered through the console 18 to record the old and new image data onto respective separate sessions (step 220), the central processor 10 transfers the former or old data stored in the temporary storage 104, upon forming one session therewith, to the recorder 30, and then transfers the new data stored in the temporary storage 104, upon forming another session therewith, to the recorder 30. The recorder 30 records those data onto the new disc 36 in the form of separate sessions (step 226).

Figure 2:
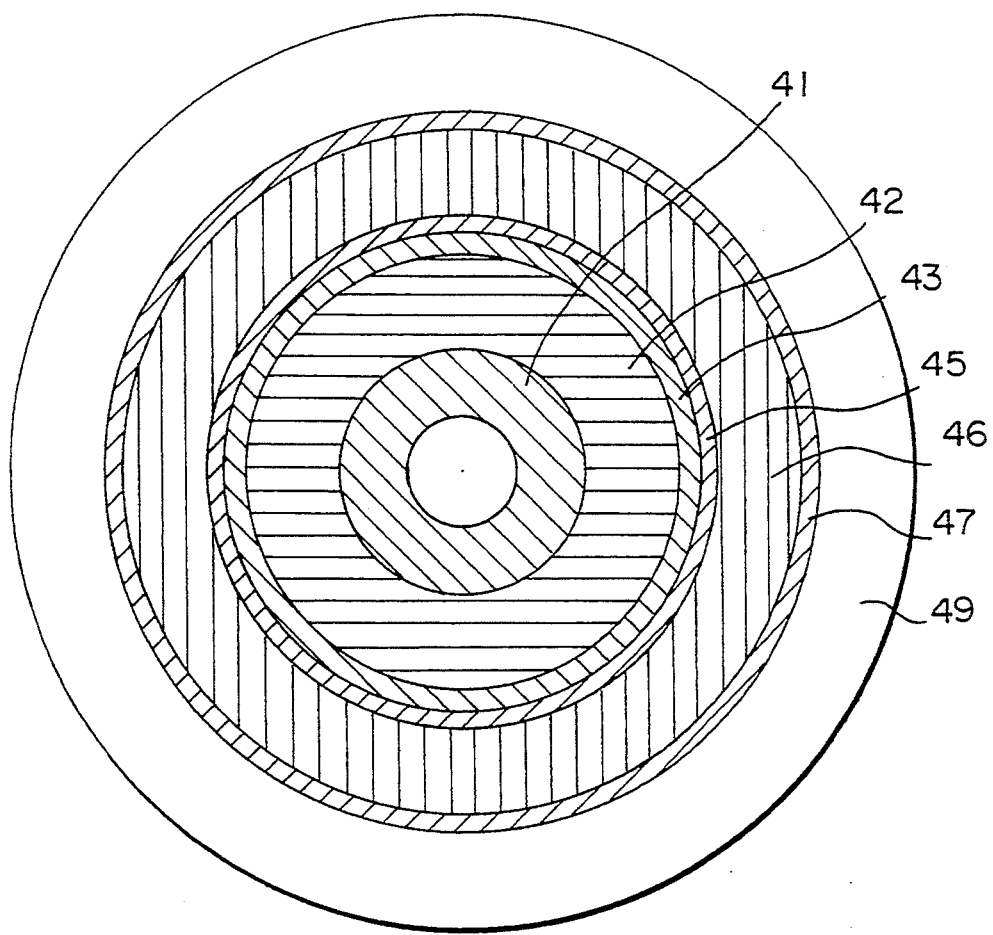
FIG. 2 is a top plan view showing conceptually the recorded state of data in which both old and new data are recorded in the form of two sessions by the data recording apparatus for optical discs shown in FIG. 1.

FIG. 2 shows the state of a recording area of the disc 36 on which two sessions have been recorded. In this example, there are formed, in the order from the center of the disc 36 toward the outside, a lead-in groove area 41 of one session, a program groove area 42 including the old image data, and a lead-out groove area 43. In addition, outside those areas, a lead-in groove area 45 of another session, a program groove area 46 for the new image data, and a lead-out groove area 47 are formed. Further, outside both of the sessions, there remains a virgin area 49 in this example.

In the event that the old and new data are desired to be unified to each other, then the operator inputs an instruction for unification through the console 18. In response to the instruction, the control and arithmetic unit 102 of the central processor 10 unifies and organizes the old and new image data stored in the temporary storage 104 in the form of a single session (step 222). In this organizing processing, it may be performed either to rearrange the frames of image, or to simply accommodate the old and new images into one session.

When the re-arrangement of the frames of image is designated by the operator console 18, reduced images such as index images are displayed on the display 14. The operator sets up through the console 18 the order of the frames of image, observing the monitor images on the display 14. In the case of the unification of the session, the control and arithmetic unit 102 regenerates the data for the lead-in groove area and the lead-out groove area, without regard to whether or not the frames of image are re-arranged in order to change the associated data in accordance with modification of factors such as the number of image data within the session and the recording area. The recorder 30 then records those data onto the new disc 36 in the form of an organized single session (step 224).

Figure 3:
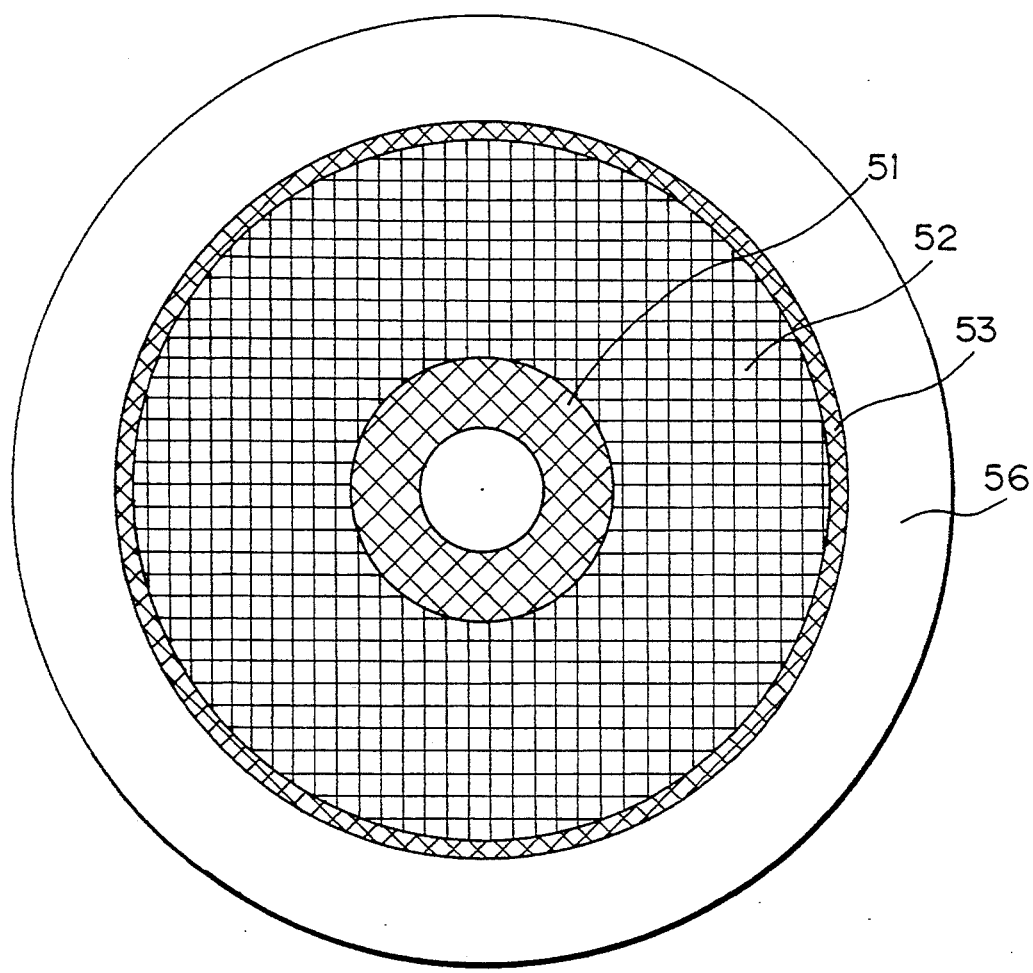
FIG. 3 is also a top plan view showing conceptually the recorded state of data in which both old and new data are recorded in the form of a single, unitary session by the data recording apparatus shown in FIG. 1.

FIG. 3 shows the state of a recording area of the disc 36 after having data recorded in the form of a single session. In this example, there are formed, in the order from the center of the disc 36 toward the periphery, a lead-in groove area 51, a program groove area 52, a lead-out groove area 53, and a residual, unused area 56. Thus, both the old and new image data are written into the virgin compact disc 36 having no defect so as to form the program groove area 52. The compact disc 36 thus completed is delivered to the customer together with the entrusted negative film and disc 26.

According to the illustrative embodiment, there is arranged such that unification of the old and new image data in the form of a single session and organization to respective separate sessions are optionally selectable through the console 18. However, it should be noted that the present invention is not restricted to the specific arrangement. It is possible to arrange a system available only for unification to a single session, or a system available exclusively for organization to individual sessions. Further, according to the embodiment, there is arranged such that the verification (step 210) of the disc 26 is carried out after the new image data have been processed (step 206). However, the invention is not restricted by the specific order of processings. For example, the system may be arranged in such a manner that the first, unused recording area of the disc 26 is verified, and thereafter the film image is read by the scanner 16.

According to the instant embodiment described above, for example, image data are read from the disc having some defect, and new data are recorded on a new disc together with the read image data, thereby avoiding a destruction of the former data. Further, according to the embodiment, it is possible to design a system in which either a unification to a single session or an organization to individual sessions are optionally selectable, being thus effective in a later playback and management use of the data.

Figure 6:
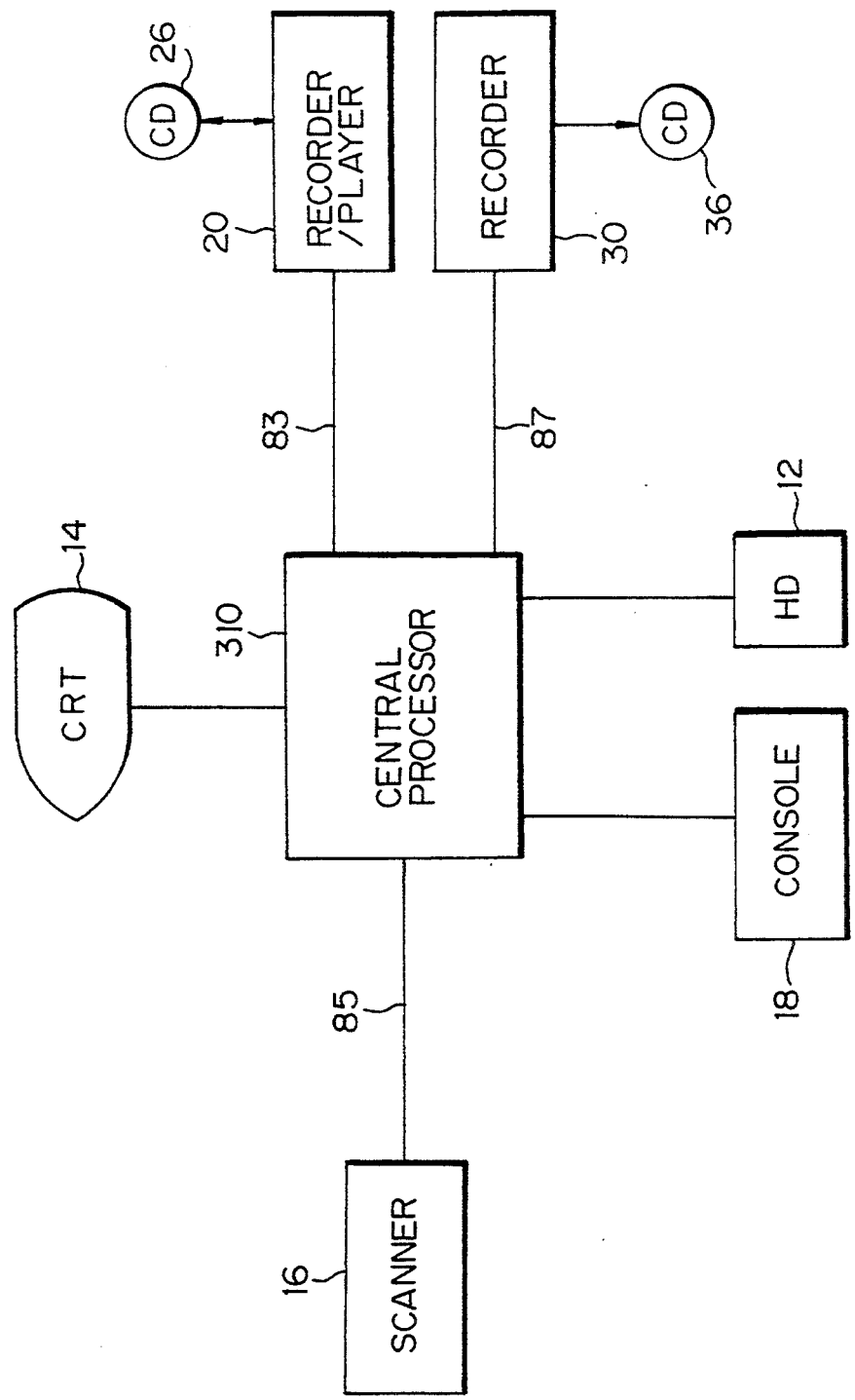
FIG. 6 is a schematic block diagram showing a functional system structure of an optical disc verifying apparatus according to another embodiment of the invention.
Figure 7:
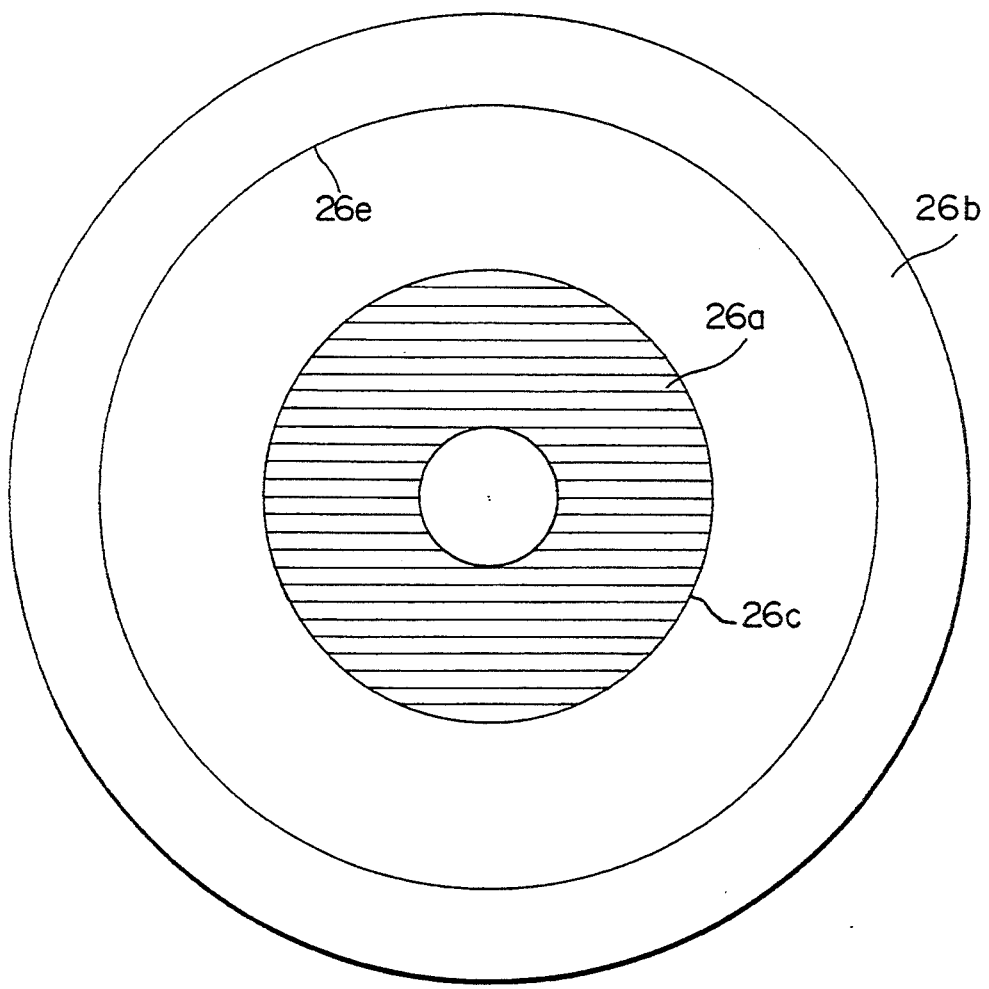
FIG. 7 is, similar to FIG. 2, a top plan view showing conceptually the recorded state of image data with respect to an example of a disc to be inspected by the optical disc verifying system.

Next, a preferred embodiment of an apparatus for verifying an optical disc will be described. FIG. 6 shows a data recording apparatus for use in optical discs which also implements a method of verifying optical discs according to the invention. In FIG. 6, like parts and elements are denoted by the same reference numbers as those of FIG. 1. The data recording apparatus for use in optical discs is adapted to record, on an additional-recording type of compact disc 26, which may be so-called the photo disc regulated by the Kodak and Philips' standard, for example, image signals which may be obtained from an image data source, for example, a scanner 16 and/or a hard disc 12. The data recording apparatus may be installed, for example, at a laboratory of a photo CD software supply trader. As the compact disc 26, in the present embodiment, any types of optical disc such as an additional writing and a rewriting type are available, and further the one-time recording and the so-called rewriting type of disc re-usable upon erasing are also available. The compact disc 26 is brought by a customer to the laboratory together with a negative carrying images of an object to be recorded to be sensed by the scanner 16 for instance. Thus, in many cases, the compact disc 26 is provided with an area 26a, as shown in FIG. 7, on which image data have been already recorded, and there is formed a pre-groove, not illustrated, in a virgin area 26b of the disc 26.

The compact disc 26 is detachably set to a CD recorder/player 20 which is adapted to record image data on the disc 26 and/or to read therefrom the recorded image data. The reading function may be omitted from the recorder/player apparatus 20. The recorder/player 20 is provided with, as shown in FIG. 8, a photosensitive pickup 21 which serves to irradiate a laser beam 60 onto a recording surface 26d of the compact disc 26, and upon receipt of part of the light reflected from the recording surface 26d, produces the corresponding electric signal on a signal line 62.

Figure 8:
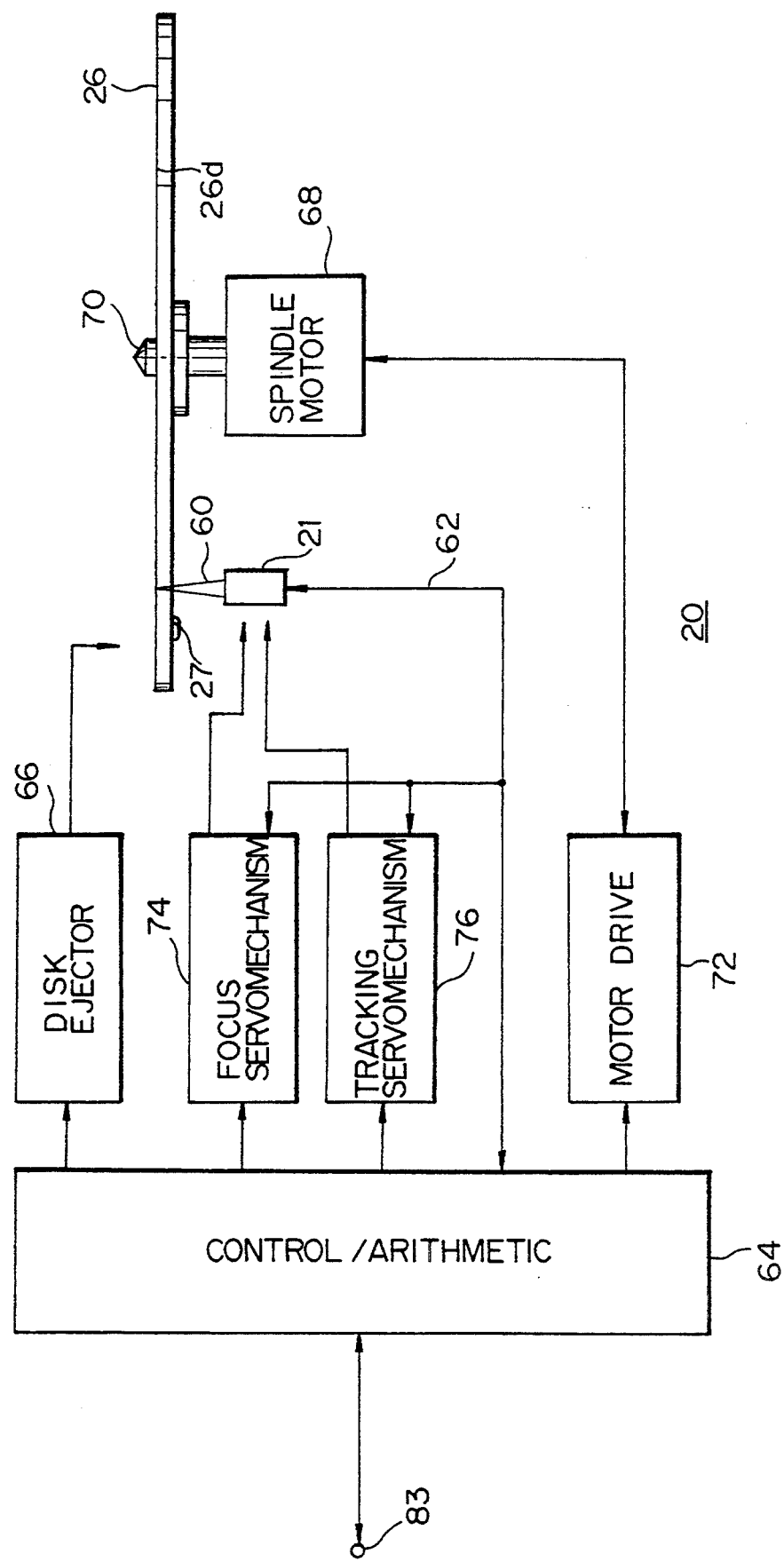
FIG. 8 is a schematic diagram showing by way of a specific example a functional structure of a CD recorder/player in the optical disc verifying apparatus shown in FIG. 6.

The recorder/player 20 is also provided with a function such that prior to recording new image data 30 on the disc 26, the presence/absence of a defect or hindrance 27, shown in FIG. 8 with emphasis, against recording and/or playback, such as dirt and a crack on the recording surface of the disc 26, is determined. This verification is accomplished by a control and arithmetic unit 64 for performing an analysis and arithmetic operations on the basis of the signal representing the quantity of the reflected light appearing on the signal line 62, which signal is outputted from the photosensitive pickup or recording or playing back head 21. The analysis and arithmetic operations will be described in detail later. Further, the recorder/player 20 is provided with an additional function such that when the defect 27 is found on the disc 26, the disc 26 will be discharged. Thus, the recorder/player 20 has a disc ejector mechanism 66.

The recorder/player 20 includes a spindle motor 68, on an output shaft 70 of which the disc 26 is detachably mounted. The spindle motor 68 is driven by a motor drive circuit 72 to be rotated at a predetermined angular velocity. The photosensitive pickup or transducer 21 receives part of the laser beam 60 focussed by a focus servo or automatic focus control mechanism 74 on the recording surface 26d, which part is reflected on the surface 26d to be subjected to the tracking along a train of pits or pre-groove, not shown, formed on the recording surface 26d by a tracking servo or automatic tracking mechanism 76. The tracking servomechanism 76 is provided with a transport mechanism adapted to movably carry and transport the pickup 21 in the radius direction of the disc 26. Those mechanisms 66, 72, 74 and 76 are controlled by the control and arithmetic unit 64. Preferably, the control and arithmetic unit 64 is implemented by a processing system such as a personal computer.

According to the preferred embodiment of the invention, there is provided an additional CD recorder 30, which is connected through connection line 87 of the so-called SCSI Interface to the central processor 310. The recorder 30 is adapted for recording image data onto an additional compact disc 36. These recording apparatus 30 and compact disc 36 are similar to or may be the same as those referred to in the former embodiment shown and described with reference to FIG. 1.

The recording apparatus according to the present embodiment verifies the disc 26, prior to recording image data on the disc 26, to determine the presence/absence of the defect or trouble 27 on the recording surface of the disc 26. In order to achieve recording of the image data and verification of the disc surface under the control of the system in its entirety, the data recording apparatus is provided with a central processor 310. The central processor 310, including the peripheral equipment, which will be described later, are implemented advantageously with a general-purpose processing system such as a personal computer system commercially available. Connected on an interface basis to the central processor 310 are external devices such as the scanner 16, and the recorder/player 20 through connection lines 83 and 85 of the SCSI interface. The central processor 310 performs a general and overall control of the system in its entirety, and in addition has functions such as processings for image recording, such as loading the image data from the scanner 16, color and tonal or gradation correction of the image, compression and encoding of the image data, and a conversion to the compact disc standard of recording format. In order to store those image data, connected to the central processor 310 is the hard disc 12.

The recording apparatus includes a display unit such as a CRT 14 for visually displaying the states of the system and images under processing, and a console 18 for entering operator's instructions and data. These are connected also to the central processor 310, and are similar to or may be the same as those referred to the former embodiment as shown in FIG. 1.

Figure 12:
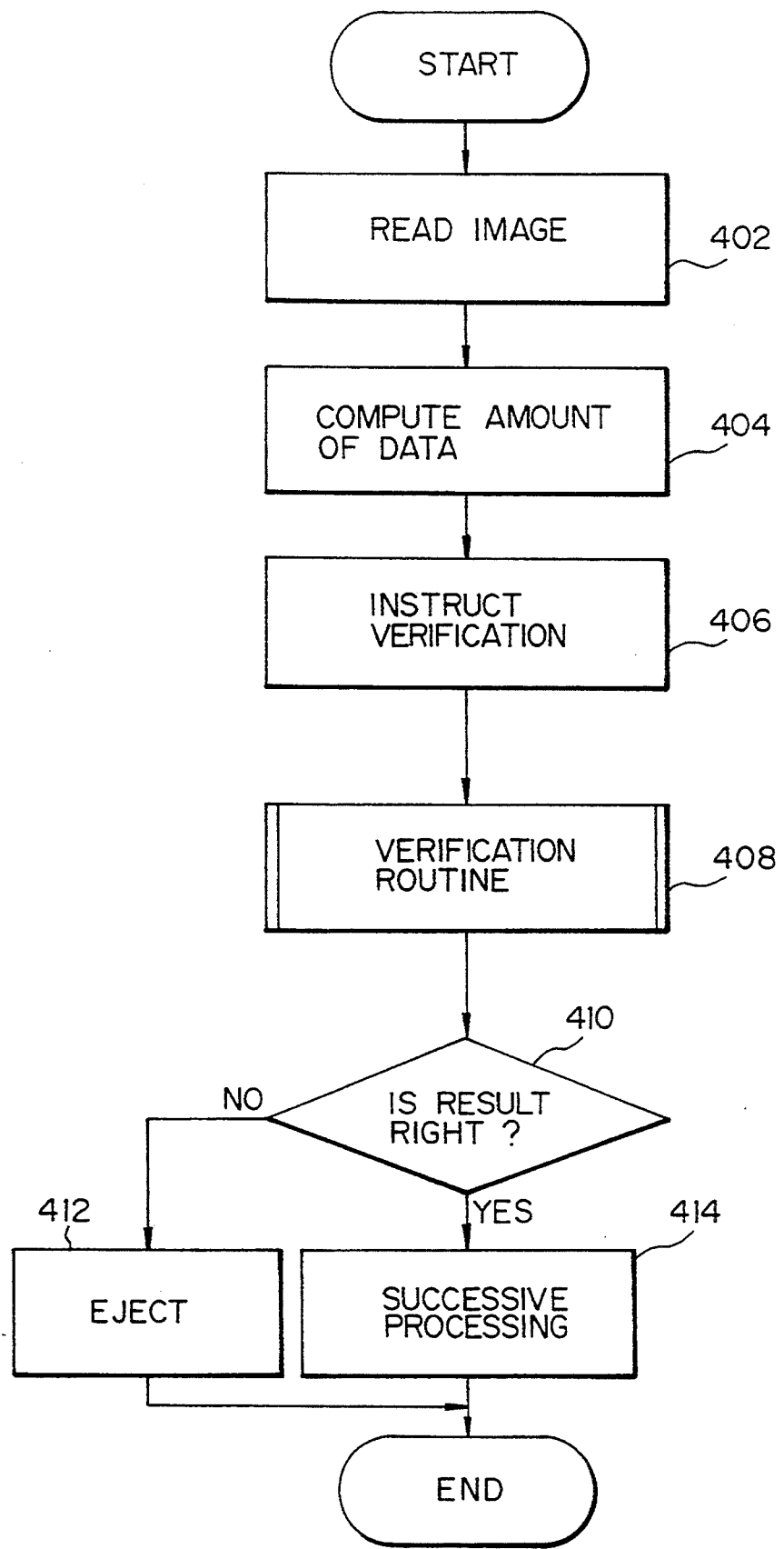
FIG. 12 is a flow chart useful for understanding how the disc verifying system shown in FIG. 6 operates.
Figure 13:
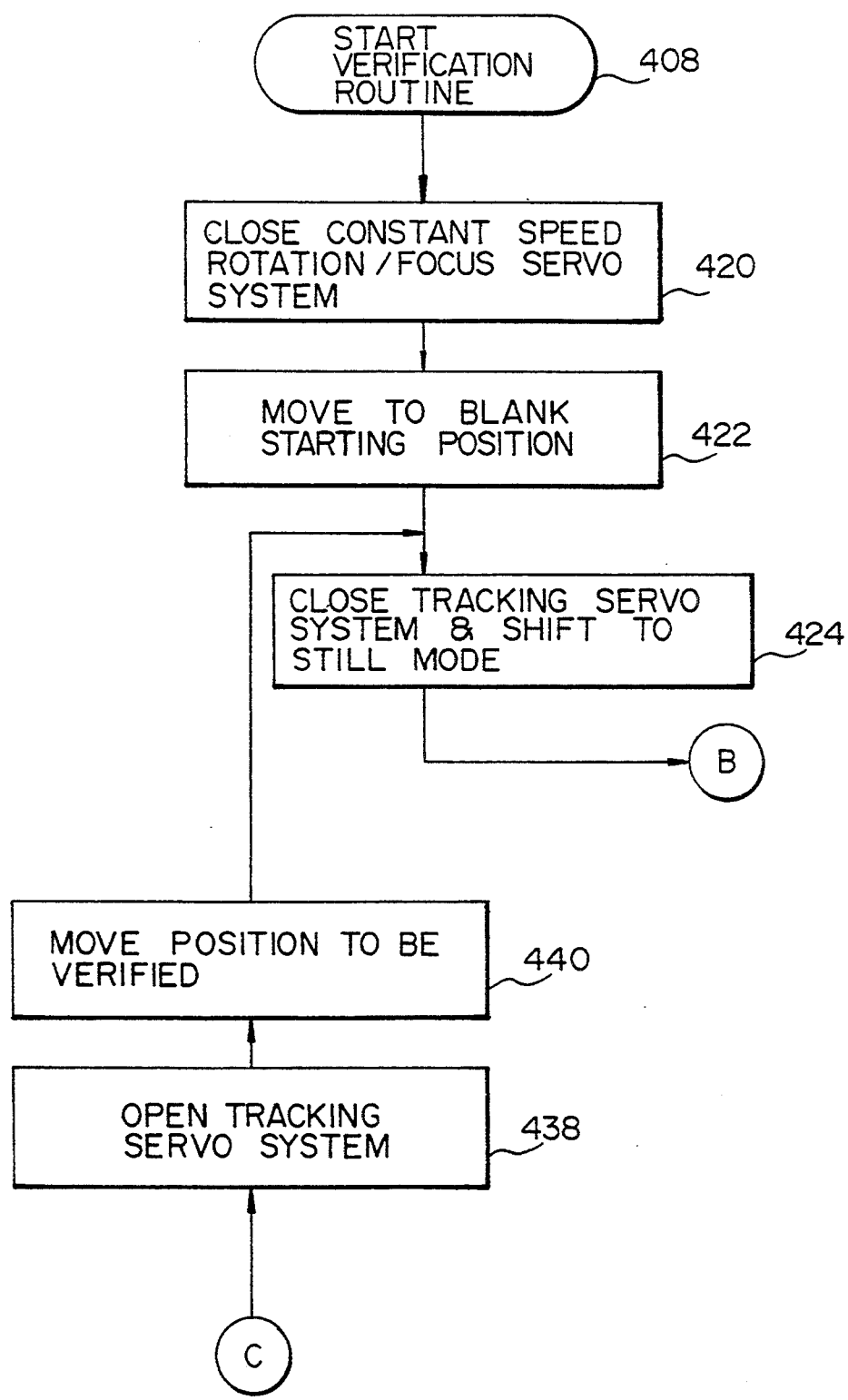
FIGS. 13 and 14 are flow charts showing details of a verifying routine of the flow chart of FIG. 10.

Referring to FIGS. 12 and 13, in operation a negative film, not shown, brought in the laboratory is set to the scanner 16, while the compact disc 26 also brought together with the negative film is set to the recorder/player 20. An operator designates a frame of image recorded on the negative and instructs reading of the image thereof through the console 18. In response, the central processor 310 controls the scanner 16 to read the designated image which the film carries. Image data representing the read image are transmitted over the connection line 85 to the central processor 310. In the central processor unit 10, the received image data are subjected to the image processing such as color and tonal correction of image, and compression and encoding of the image data, and then the processed data are stored in the hard disc 12 (step 402 in FIG. 12). The central processor 310 computes or estimates the amount of the image data subjected to the data compression from frame to frame, as well as the total amount of the image data to be recorded onto an unused recording area 26c of the compact disc 26 (step 404). Further, the central processor 310 instructs the recorder/player 20 to verify or inspect the disc 26 (step 406), so that it may be confirmed, prior to recording of the new image data onto the disc 26, that the disc 26 does not have any defect or hindrance against data recording and/or reading.

In response to the instruction of verification from the central processor 310, the recorder/player 20 initiates a verifying routine (step 408, FIG. 13). In the verifying routine, in response to the verifying instruction, the control and arithmetic circuitry 64 controls the motor drive 72 to rotate the disc 26 at a predetermined angular velocity, and the focus servomechanism 74 as well to set the focussing servo system of the photosensitive pickup 21 to its closed state (step 420), while the tracking servo system to its opened state.

In many cases, the additional or post-writing type of compact disc 26, which is brought by customers to the laboratory, is provided with an area 26a, as shown in FIG. 7, on which data have been already recorded. The recording and reading of the disc 26 are carried out along by a spirally shaped track from the center of the disc 26 toward its periphery. The control and arithmetic unit 64 controls the tracking servomechanism 76 to transport the photosensitive transducer 21 from the center of the disc 26 toward the outside so as to detect a position 26c at which a blank area starts, or a boundary between the area 26a in which image data have been already recorded and the area 26b in which image data are not yet recorded. When the boundary portion 26c is determined, the photo sensitive pickup 21 is stopped in transportation at the associated track (step 422). The control and arithmetic unit 64 has estimated a goal position 26e at which the verification is terminated on the basis of the amount of the image data to be newly recorded which have been supplied from the central processor 310. The position 26e is the final position as a recording position of data involved in the new image read by the scanner 16, in other words, the starting position of the virgin area 26b. For example, in the case of the compact disc 26 available for the recording capacity of 100M bytes of image data, if it is assumed that 8 frames of image data, 48M bytes continuing from the depicted boundary portion 26c are recorded on the virgin area 26b, then the track position 26e of the final portion of that recording depicted in the figure is estimated.

Figure 9:
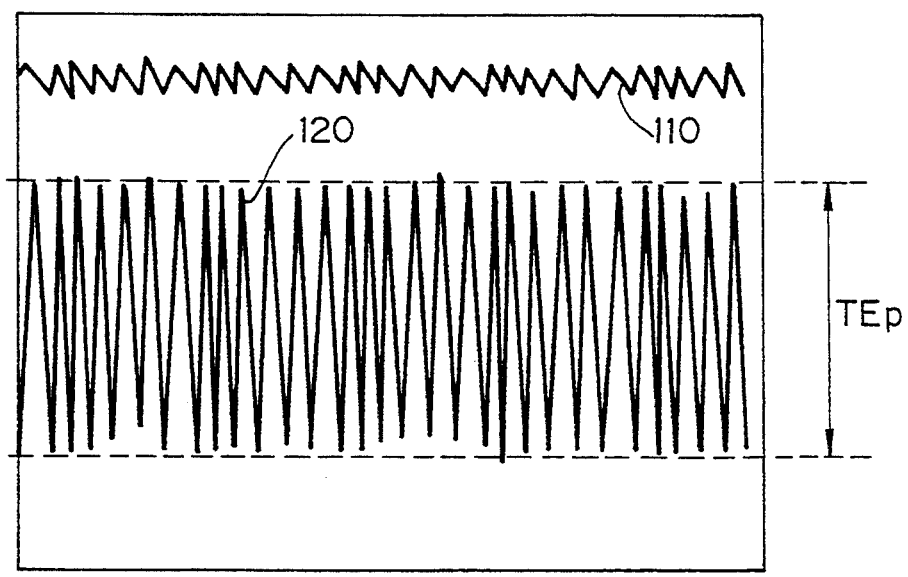
FIG. 9 plots exemplarily the quantity of reflected light and tracking signals which are received by a photosensitive pickup in the open state of the track servo system in the CD recorder/player in the optical disc verifying apparatus shown in FIG. 6.

A signal, which the photosensitive pickup 21 acquires in the opened state of the track servo system, is similar to that in the complete tracking error. Such a signal is affected by the pits of the recording data, the pre-groove, etc., and thus will be represented by an irregular high-frequency signal as shown in FIG. 9. This figure represents a signal obtained by one turn of the disc 26 with respect to the photo pickup 21., wherein a waveform 110 at the upper stage represents the amount or intensity of the reflected light, and a waveform 120 at the lower stage represents a tracking signal. Likewise, regarding FIGS. 10 and 11, this is also applicable thereto.

When the photosensitive pickup 21 reaches the blank starting position 26c, the control and arithmetic unit 64 controls the tracking servomechanism 76 to close the tracking servo loop and set it up in the still image reproduction mode (step 424). As well known, the playback and/or recording of the compact disc 26 are performed along by a spirally shaped train of pits or pre-groove from the center of the disc 26 toward the outside thereof. Specifically in this case, the pit train corresponding to one turn of the disc 26 is referred to as a track. In the still image reproduction mode, scanning with the photosensitive pickup 21 is performed in such a manner that after travelling along the pre-groove of the disc 26, the photosensitive pick up 21 jumps one track to restore itself again, so that the same pre-groove is subjected to a plural number of tracking.

Figure 14:
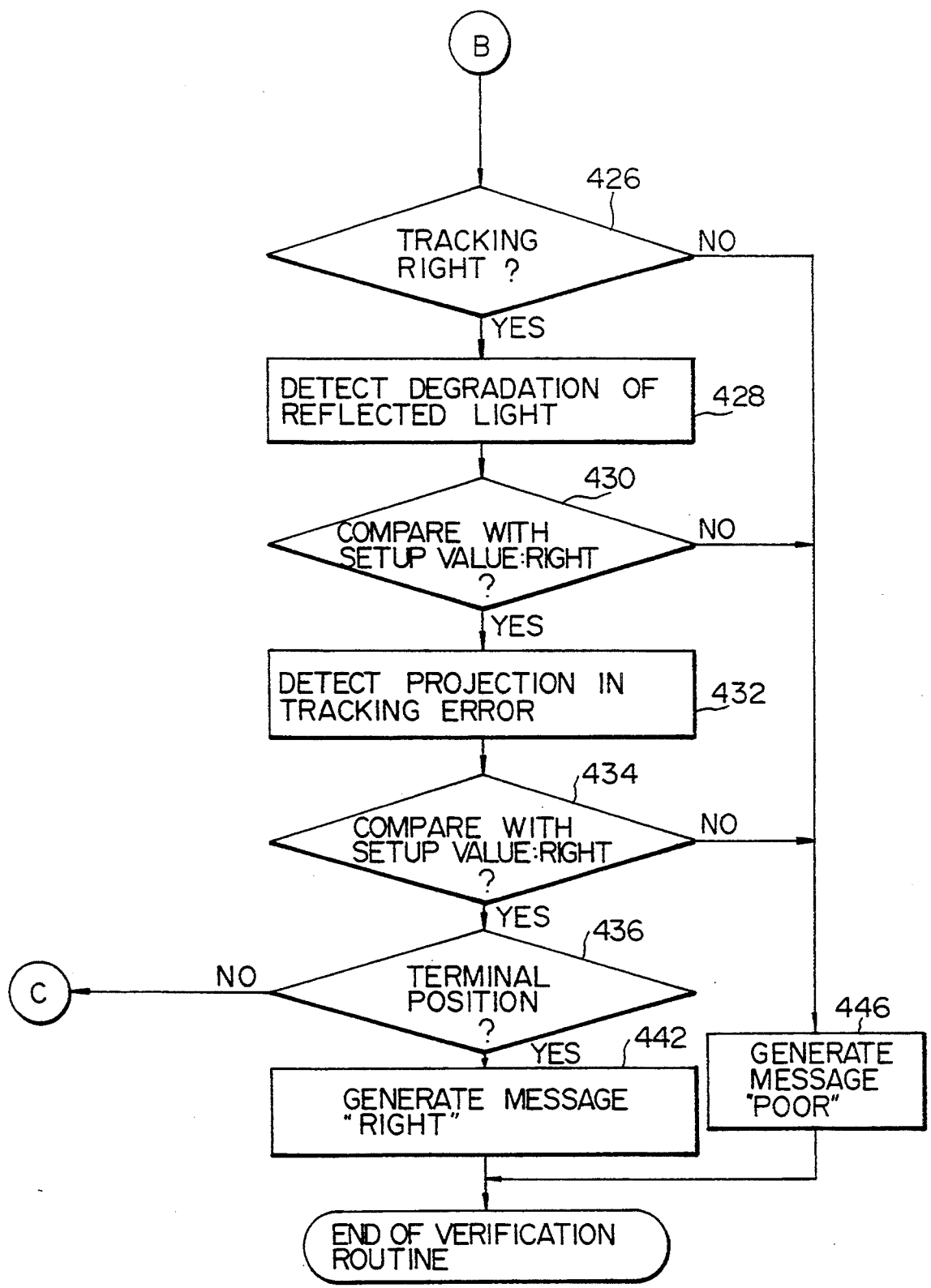

The control and arithmetic unit 64 determines whether or not the tracking operation is normally performed at the verifying position (step 426, FIG. 14). The tracking of the virgin area 26b is performed along the pre-groove formed on disc 26. If the tracking operation is normal, then the procedure advances to the subsequent verification routine 428, but if abnormal, then message "poor" is generated (step 446) not to perform any verification hereafter.

Figure 11:
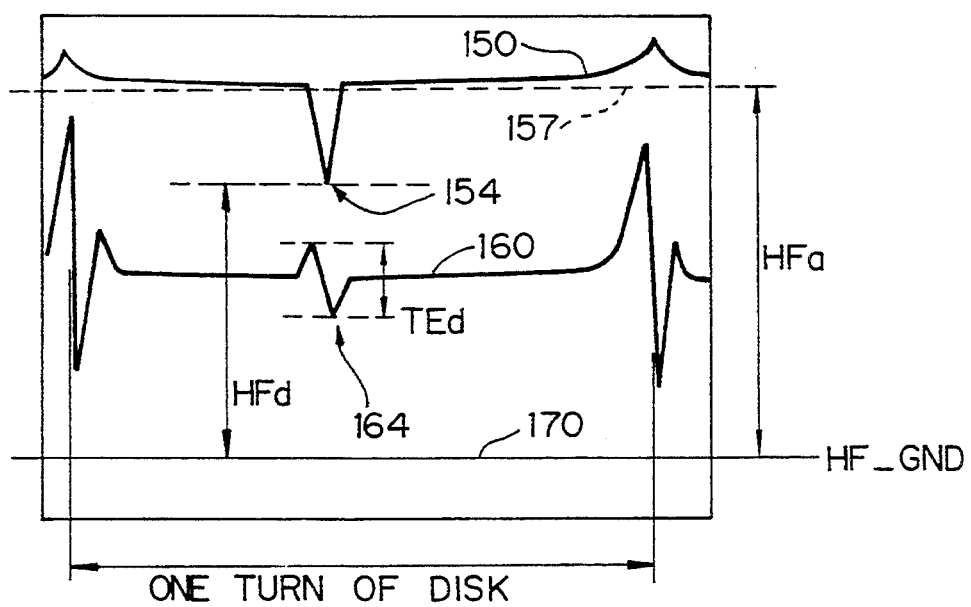
FIG. 11 is also a graph plotting exemplarily the quantity of reflected light and tracking signals which are received by the photosensitive pickup in the close state of the track servo system with defects existing on the recording surface of the disc in the same CD recorder/player.

If there is found a normal tracking on part of a pre-groove corresponding to at least one turn of the disc 26, the control and arithmetic unit 64 detects degradation in the amount of the reflected light on the same pre-groove (step 428). More specifically, the circuitry 64 measures a minimum value 154 of the intensity of the reflected light 150 from the recording surface 26d of the disc 26, as shown in FIG. 11. The CD recorder/player 20 compares the measured value 154 with a predetermined set-up value through the analysis processing which will be described later (step 430). It is acceptable to repeatedly carry out the measurement and comparison a plural number of times of a turn of the disc 26. If a result from the comparison is satisfactory, the control is transferred to the subsequent step 432 for detecting a tracking error projection. On the contrary, if the comparison result is poor, then the message "poor" is generated (step 446) to escape from the verification routine (step 408).

Figure 10:
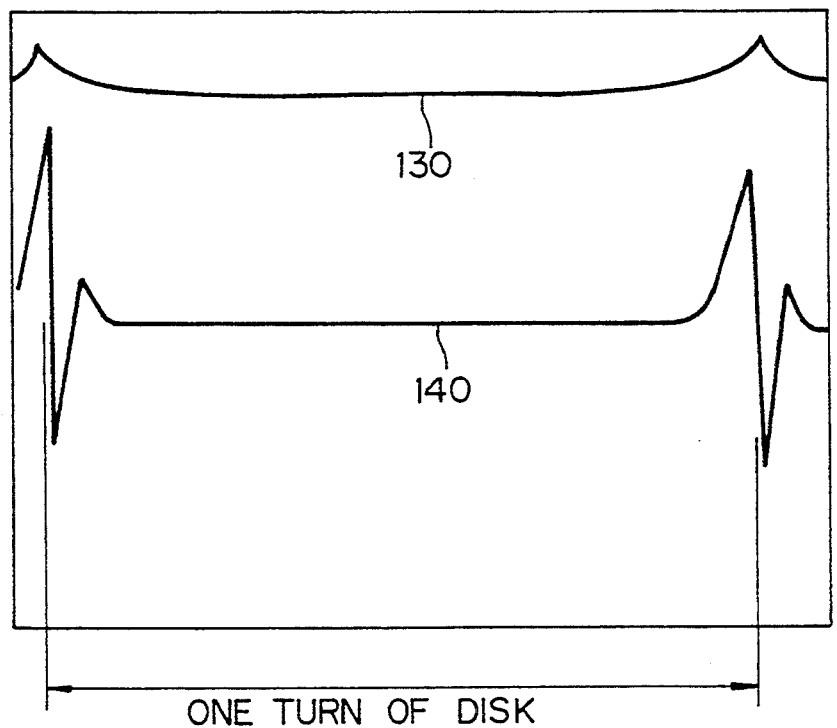
FIG. 10 plots exemplarily the quantity of reflected light and tracking signals which are received by the photosensitive pickup in the close state of the track servo system without defect on the recording surface of the disc in the same CD recorder/player.

An amount or intensity of the light reflected from the recording surface 26d of the disc 26, which the photosensitive pickup 21 head receives, maintains a stable level given by waveforms 130 and 140 plotted in FIG. 10, if there is found no defect, such as a crack and dirt, on the disc 26. However, if defect 27 exists on the disc 26, the waveform includes a level drop 154 found as shown in FIG. 11. In the latter case, it often results that the tracking signal also includes a corresponding level drop 164. The disturbances appearing on the waveforms at the right and left in FIG. 11 represent that the amount of reflected light received by the photosensitive pickup 21 is disturbed by effect of the pre-groove, when the photosensitive pickup 21 is kept tracing the same track in the still image reproduction mode to restore itself to the starting position on that track. Therefore, such disturbances on the waveforms does not result, when the photosensitive pickup 21 does not perform the still image reproduction operation.

The amount of the level drop in the reflected light due to the defect 27 on the recording surface 26d is quantitatively analyzed in the control and arithmetic unit 64 in the following manner. In the light quantity which is measured by photosensitive pickup 21 while the tracking loop is closed, or the corresponding voltage value to which the light quantity is converted, referring to FIG. 11, it is assumed that letters HF GND denotes a zero (O) level 170 of the amount of the reflected light from the disc 26, that is, the incident light quantity to the photo pickup 21; HFa an average amount 157 of the reflected light on one track taking the level HF GND as a reference value; and HFb a minimum value 154 of the amount of the reflected light. The following relationship is then established.

$$HFn = (HFa - HFd)/HFa \qquad (1)$$

The recorder/player 20 compares an operation result HFn obtained from the above-noted equation (1) with a predetermined set-up value (step 430), and determines the verification to be right, if the difference is within a predetermined range. On the other hand, if the difference is out of the predetermined range, the verification result is determined to be faulty. The set-up value for use in determining the quality is selected by experiments. While the control and arithmetic unit 64 continues the still reproduction by the photosensitive pickup 21, it detects the tracking error projection 164 on the same pre-groove (step 432), if the verification result is right. The detection of the tracking error projection 164 is performed in a similar way to the detection (step 428) of degradation of the amount of the reflected light. More specifically, analysis and comparison (step 434) with a set-up value are performed, and if a comparison result is right, then the series of verification on the track is terminated.

The analysis as to the set-up value for the tracking error projection is as follows. If the tracking operation along the pre-groove is normal, a signal which the photosensitive pickup 21 acquires is a stable signal 140 as shown at the lower stage of FIG. 10. However, if the defect 27 exists on the disc 26, there is generated an unstable point 164 as shown in FIG. 11. The amplitude TEd of the unstable point 164 is quantitatively analyzed to determine the quality, in a similar fashion to that in the cases of the detection (steps 428 and 430) of degradation of the amount of the reflected light. Referring to FIG. 9, it is assumed that TEp denotes the average of the amplitude of the tracking signal 120 when the track servo system is opened. The following expression will then be applicable.

$$TEn = (TEp - TEd)/TEp \qquad (2)$$

The recorder/player 20 finds an operation result TEn on the basis of the above-noted equation (2), and determines the track to be normal, if the value TEn is within a predetermined range. On the other hand, if the value TEn is out of the predetermined range, the track is determined to be 20 abnormal. The set-up value for determination of the quality is also selected by experiments, similar to that in the case of detection of degradation of the amount of the reflected light. For example, such a set-up value may take a value substantially equal to one-third of the average amplitude TEp of the envelope of the tracking signal 120.

The affection of the defect 27 on the recording surface 26d of the disc 26 to the data signal is simply to degrade the signal level in its entirety during the reproduction operation, in the case where the disc 26 is of a one-time writing type of ROM on which the signal has been normally recorded. However, in the case where the disc 26 is of an additional writing type, then the data signal may be affected by the defect 27 during not only the playback operation, but also the data recording operation. The aspect of the affection is equivalent to the observed degradation of the light quantity on the pickup 21 due to the shielding effect by the defect 27. The shielding effect causes an indefinite recording of the signal, for example, a faulty recording position due to a poor focussing, etc. It is found experimentally that the additional writing type of disc is much more sensitive to the defect on the recording surface with multiplied effects accompanying, compared with discs which are forwarded with data recorded. Consequently, it is necessary for the additional writing type of disc to more strictly verify whether or not a defect exists on the recording surface of the additional or post-writing type of disc.

When the series of verification on one track, as mentioned above, is normally terminated, the control and arithmetic unit 64 confirms whether the photo-sensitive pickup 21 has reached the goal position 26e at which the recording is terminated and which was estimated before (step 436). If it does not yet reach the goal or final position 26e, the tracking servo loop is opened (step 438) to move (step 440) the photo-sensitive head 21 to the subsequent verification position, i.e. the unused track, and then the procedure returns to the step 424 of the tracking servo loop closed in the still image reproduction mode. Thereafter, the control repeats the steps 424 to 436. In that process, if it is determined in the step 436 that the photosensitive pickup 21 has reached the goal position 26e of termination of the recording, the message "right" which indicates that the verification result is preferable or satisfactory, is generated (step 442), and the verification routine is terminated. The information representing the verification result "right" is transferred from the recorder/player 20 to the central processor 310 to confirm it therein (step 410).

In this example, since the verification result is preferable, the central processor 310 advances the control to the next processing 414 in which new image data is additionally recorded into the unused area 26b of the verified disc 26. This image data is one read from the negative film by the scanner 16 and having been stored in the hard disc 12. The central processor 310 reads out the image data from the hard disc 12 to convert it into the recording format of the compact disc. The converted image data is transmitted to the recorder/player 20, so that it writes the image data into the unused area 26b. In this manner, the additional writing type of compact disc 26 brought by customers is verified, and if there is found no hindrance against recording new image data, the new image data is additionally recorded on the disc 26.

On the other hand, in the event that the control and arithmetic unit 64 detects the defect 27 on the recording surface 26d of the disc 26, and then determines it to be faulty, in the decision steps 426, 430 or 434, the message "poor" is generated (step 446) to escape the verification routine 408. Upon receipt of the message "poor" from the recorder/player 20, the central processor 310 confirms it (step 410) and ejects the disc 26 from the recorder/player 20 (step 412) to terminate the whole process. The ejection or discharge of the disc 26 is carried out under the control of the control and arithmetic unit 64 by the disc eject mechanism 66. The reason why the failure disc is discharged is that compatibility with the conventional CD player is maintained in the present system.

Also, in the event that the compact disc 26 brought by customers is determined to be faulty, it is acceptable that both the old and new image data are recorded by the recorder 30 on the virgin disc 36 which is prepared by laboratories, without writing the new image data into the verified disc 26. In this case, the central processor 310 controls the recorder/player 20 to read out the whole data recorded on the disc 26 therefrom, and transfers the data to the recorder unit 30 to record those on the new disc 36. Since read out from the disc 26 is provided with a larger tolerance to the noise in comparison with that in the case of recording, in many cases there is found no hindrance to the read out from the disc 26, as far as the defect 27 is of usual extent. Subsequent to recording to the blank disc 36, the central processor 310 reads out the image data stored in the hard disc 12 to convert it into the recording format of the compact disc, and causes the recording apparatus to write the converted data onto the disc 36. Thus, both the old and new image data are written onto the compact disc 36 having no defect 27. This disc is supplied to the customer together with the negative film entrusted.

As described above, in the verification routine 408, there are performed as a set three kinds of verification, such as the tracking operation, the detection of degradation of the amount of the reflected light on the track formed by the pre-groove, and the detection of the tracking error projection. The set of verification processes may be arranged in such a manner that the verification is carried out on certain ones of the pre-grooves of the disc 26 on the intermittent locations at suitable intervals. The reason why the verification is not carried out on all of the tracks in the portions of the unused area 26b from the boundary 26c to the terminal position 26e of recording on the recording surface 26d, but partially carried out is that it is anticipated that the defect 27 such as dirt, cracks and the like, which will interfere with the use of the disc, is of a certain large one. This intermittent interval distance is also selected by practical experiments. According to this verification on the basis of intermittent location, it is possible to reduce a time required for the disc verification.

According to the present embodiment described above, it is possible, prior to the additional writing of data, to verify the disc condition to determine whether or not a defect is present on the disc under verification. Consequently, even if the verified disc is faulty or poor, it is possible to prevent the recorded data from being destroyed and also to prevent the new data from being improperly written onto the disc.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An apparatus for recording image data on a post-writing basis onto a write-once, read-many optical disc of the compact disc standard, comprising:
    reader means for reading first image data recorded on a first optical disc;
    input means for inputting second image data;
    detection means for detecting the presence of a defect on a surface of said first optical disc;
    recording means for recording image data onto a second optical disc; and
    control means, operatively coupled to said reader means, said input means, said detection means and said recording means for controlling said reader means to read out the first image data from said first optical disc and for controlling said recording means to record the first and second image data onto said second optical disc when said detection means detects the presence of a defect on said first optical disc.

2. The apparatus for recording image data according to claim 1, wherein said control means comprises unifying means for combining the first and second image data for recording onto said second optical disc during a single session.

3. The apparatus for recording image data according to claim 1, wherein said control means controls said recording means to record the first and second image data onto said second optical disc during respective, independent sessions.

4. The apparatus for recording image data according to claim 1, wherein said reader means comprises verification means for verifying a condition of said first optical disc to determine presence/absence of a defect on said first optical disc,
    said control means controlling said reader means to read out the first image data from said first optical disc and controlling said recording means to record the first and second image data onto said second optical disc when said verification means finds a defect on said first optical disc.

5. A method of recording data on a post-writing basis onto a write-once, read-many optical disc of the compact disc standard, comprising the steps of:
    reading first image data recorded on a first optical disc;
    preparing second image data;
    detecting the presence of a defect on a surface of the first optical disc; and
    recording the first and second image data onto the second optical disc during respective, independent sessions when the presence of a defect is detected on the surface of the first optical disc.

6. A method of recording data on a post-writing basis onto a write-once, read-many optical disc of the compact disc standard, comprising the steps of:
    reading first image data recorded on a first optical disc;
    preparing second image data;
    detecting the presence of a defect on a surface of the first optical disc; and
    recording the first and second image data onto the second optical disc as combined first and second image data during a single session when a defect is detected on the surface of the first optical disc.

7. An apparatus for verifying a condition of a recording surface of a write-once, read-many optical disc of the compact disc standard, comprising:
    driving means for carrying and rotating the optical disc at a predetermined speed;
    pickup means for producing a first signal indicative of an amount of reflected light from the recording surface of the optical disc;
    tracking means for directing said pickup means to travel along a track of the optical disc;
    arithmetic means for detecting a disturbance of the first signal and for comparing the first signal which corresponds to the disturbance with a first predetermined value to determine a condition of the optical disc,
    said arithmetic means determining that the optical disc is defective if the first signal which corresponds to the detected disturbance exceeds the first predetermined value; and
    means for discriminating a tracking error from the first signal produced by said pickup means during tracking controlled by said tracking means,
    said arithmetic means comparing the discriminated tracking error with a second predetermined value and determining that the optical disc is defective if the discriminated tracking error exceeds the second predetermined value,
    the second predetermined value being a value substantially equal to one third of an average amplitude of an envelope formed by the first signal while said tracking means does not track.

8. An apparatus for recording data on a post-writing basis onto a write-once, read-many optical disc of the compact disc standard, comprising:

reader means for reading first image data recorded on a first optical disc;

input means for inputting second image data;

recording means for recording image data onto a second optical disc; and control means, operatively coupled to said reader means, said input means and said recording means, for controlling said reader means to read out the first image data from said first optical disc and for controlling said recording means to record the first and second image data onto the second optical disc, said reader means including verification means for verifying a condition of a surface of the first optical disc, said verification means comprising driving means for carrying and rotating said first optical disc at a predetermined speed, pickup means for producing a first signal indicative of an amount of reflected light from the recording surface of said first optical disc, tracking means for directing said pickup means to travel along a track of said first optical disc, and arithmetic means for detecting a disturbance of the first signal and for comparing the first signal which corresponds to the detected disturbance with a first predetermined value to determine a condition of said first optical disc, said arithmetic means determining that said first optical disc is defective if the first signal which corresponds to the detected disturbance exceeds the first predetermined value.

9. The apparatus for recording data according to claim 8, wherein said control means comprises unifying means for combining the first and second image data for recording onto said second optical disc during a single session.

10. The apparatus for recording data according to claim 8, wherein said control means controls said recording means to record the first and second image data onto said second optical disc during respective, independent sessions.

11. The apparatus for recording data according to claim 8, wherein said control means controls said reader means to read out the first image data from said first optical disc and controls said recording means to record the first and second image data onto said second optical disc when said verification means detects the defect on said first optical disc.

12. The apparatus for recording data according to claim 8, wherein said verification means further comprises means for discriminating a tracking error from the first signal produced by said pickup means during tracking controlled by said tracking means, said arithmetic means comparing the discriminated tracking error with a second predetermined value and determining that said first optical disc is defective if the discriminated tracking error exceeds the second predetermined value.

13. The apparatus for recording data according to claim 8, wherein said tracking means performs repetitive tracking on a same track of said first optical disc.

14. The apparatus for recording data according to claim 8, wherein said verification means further comprises ejecting means for ejecting said first optical disc out of the apparatus when said arithmetic means determines that said first optical disc is defective.

15. The apparatus for recording data according to claim 8, wherein the first signal which corresponds to the detected disturbance includes a degradation component of the amount of the reflected light, said arithmetic means determining that said first optical disc is defective if an extent of the degradation component exceeds the first predetermined value.

16. The apparatus for recording data according to claim 12, wherein the second predetermined value is a value substantially equal to one-third of an average amplitude of an envelope formed by the first signal while said tracking means does not track.

* * * * *